United States Patent [19]
Miller

[11] 4,437,870
[45] Mar. 20, 1984

[54] OPTICAL WAVEGUIDE FIBER COOLER
[75] Inventor: Roger A. Miller, Painted Post, N.Y.
[73] Assignee: Corning Glass Works, Corning, N.Y.
[21] Appl. No.: 318,375
[22] Filed: Nov. 5, 1981
[51] Int. Cl.³ .......................................... C03B 37/025
[52] U.S. Cl. ........................................ 65/12; 65/13; 65/157; 65/158
[58] Field of Search ............... 65/12, 13, 2, 3.11, 65/32, 157, 29, 158, 160, 163; 118/65, 69; 427/163, 398.4, 398.5; 425/72 R; 264/1.5, 1.6, 264/237, 348

[56] References Cited

U.S. PATENT DOCUMENTS

| | | | |
|---|---|---|---|
| 2,225,667 | 12/1940 | Staelin | 65/12 |
| 3,248,192 | 4/1966 | Millet | 65/32 X |
| 3,540,870 | 11/1970 | Li | 65/32 X |
| 4,030,901 | 6/1977 | Kaiser | 65/32 X |
| 4,101,300 | 7/1978 | Imoto et al. | 65/2 |
| 4,126,436 | 11/1978 | Bailey | 65/13 |
| 4,154,592 | 5/1979 | Bailey | 65/32 X |
| 4,208,200 | 6/1980 | Claypoole et al. | 65/12 |
| 4,373,943 | 2/1983 | Gouronnec et al. | 65/13 X |
| 4,400,190 | 8/1983 | Briere | 65/2 |

FOREIGN PATENT DOCUMENTS 2044751 10/1980 United Kingdom .

OTHER PUBLICATIONS

Paek et al., "Forced Convective Cooling of Optical Fibers . . .", J. Appl. Phys., vol. 50, No. 10, Oct. 1979, pp. 6144–6148.

*Primary Examiner*—Richard V. Fisher
*Attorney, Agent, or Firm*—W. J. Simmons, Jr.; W. S. Zebrowski

[57] ABSTRACT

Disclosed is an optical waveguide fiber coating system having means for cooling the hot fiber prior to the time that the fiber enters the coating apparatus. The cooling means comprises an elongated tube through which the fiber passes. Cool dry helium is flowed from a porous member or an annular slot surrounding said fiber so that it has a flow component directed radially inwardly toward said fiber and a flow component which is directed longitudinally toward the opposite end of the tube.

2 Claims, 3 Drawing Figures

OPTICAL WAVEGUIDE FIBER COOLER

CROSS-REFERENCE TO RELATED APPLICATION

This application is related to U.S. patent application Ser. No. 318,374 entitled "Fiber Cooling Apparatus" filed on even date herewith.

BACKGROUND OF THE INVENTION

Glass optical waveguide fibers are remarkably strong as they are drawn, but their strength is greatly affected by physical handling. They must therefore be coated with a protective material before they come in contact with the fiber drawing tractors. For a number of reasons including improved diameter control and cleanliness, the tractors should be as close as possible to the draw furnace. At a fixed distance from the furnace, the fiber becomes hotter as draw rate increases. Thus, to cool a fiber by natural cooling, longer distances are required for higher draw speeds. For example, to cook at 125 $\mu$m diameter fiber from 1780° C. to a temperature needed to apply a cellulose acetate lacquer solution with acetone, approximately 80 cm of cooling distance is required for a draw speed of 0.5 m/sec. A distance of 120 cm is required to cool that fiber to 50° C. at a draw speed of 0.75 m/sec., and 800 cm is required if the draw speed is 5 m/sec.

The economical production of large quantities of optical waveguide fibers will undoubtedly require fiber drawing speeds greater than 1 m/sec. If no fiber cooling means is employed and if the distance between the furnace and the coating apparatus is not sufficiently long, there may be insufficient time at such higher drawing speeds for the fibers to cool by natural processes to temperatures which are compatible with application techniques employing presently developed waveguide coating materials. When the temperature of the fiber is too high, the coating may become too thin or discontinuous. If the coating is applied from a 100% solids solution, the hot fiber can cause the coating material to set up in the coating apparatus around the fiber, thus preventing any further coating material from being applied to the fiber.

The optical waveguide fiber coating system disclosed in U.S. Pat. No. 4,208,200 employs means for cooling the hot fiber prior to its entering the coating apparatus. The cooling means comprises an elongated, liquid filled container through which the fiber passes. The bottom of the container is provided with a felt wiping die which seals the container and removes excess liquid from the fiber. In a system employing this type of fiber cooling device the fiber can become so hot that it boils the liquid at high draw rates. This causes turbulence which can move the fiber laterally so that it is displaced from its proper position in the diameter measuring device. Also, the wiping means physically contacts the fiber, a factor which might adversely affect fiber strength.

In copending U.S. patent application Ser. No. 318,374, entitled Fiber Cooling Apparatus, filed on even date herewith and assigned to the assignee of the present application, there is disclosed a cooling apparatus which employs a gas rather than a liquid for cooling the fiber. The apparatus disclosed therein comprises an elongated coolant tube through which the fiber passes. Cool, dry helium is flowed into that end of the tube into which the fiber enters. The coolant tube is surrounded by a chamber containing liquified gas. The helium is cooled by flowing through a coil submersed in the liquified gas prior to being flowed into the tube. Since the flow of helium into the coolant tube is subtantially perpendicular to the fiber axis, the fiber begins to vibrate after a maximum permissable flow rate is exceeded.

SUMMARY OF THE INVENTION

It is therefore an object of the present invention to provide an apparatus for coating glass optical fibers that are drawn at relatively high drawing speeds.

Briefly, the present invention relates to a fiber drawing apparatus comprising a source of molten glass from which a fiber is drawn, means for cooling the fiber, and means for applying a protective coating to the fiber. The means for cooling is characterized in that it comprises an elongated tube surrounding the fiber, a source of cooled helium, and means surrounding said fiber at one end of the tube for flowing the cooled helium so that it has a flow component which is directed radially inwardly toward the fiber and a flow component which is directed longitudinally toward the opposite end of the tube.

DETAILED DESCRIPTION

It is to be noted that the drawings are illustrative and symbolic of the present invention and that there is no intention to indicate the scale or relative proportions of the elements shown therein.

Figure 1:
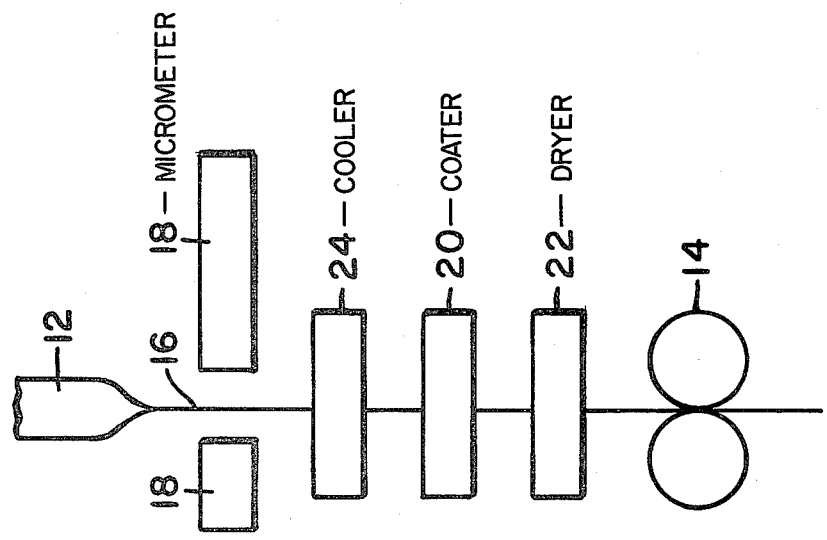
FIG. 1 is a schematic illustration in block diagram form of an optical fiber drawing system.

The conventional fiber drawing system shown in FIG. 1 comprises a solid mass of glass or preform 12 at least the tip of which is molten, a pair of tractors 14 for drawing fiber 16 from the molten glass. The softened or molten portion of the preform which tapers from the preform diameter to the fiber diameter is often referred to as the fiber root or neck-down region. The output of optical micrometer 18 is coupled to a control system which regulates the speed of tractors 14 to control the diameter of the fiber. Fiber 16 passes through a coater 20 which applies a protective material thereto, and thereafter, it may pass through a dryer 22. At high draw speeds it is necessary to employ means 24 to cool the fiber to a temperature which does not detrimentally affect the coating material applied at coater 20.

Figure 2:
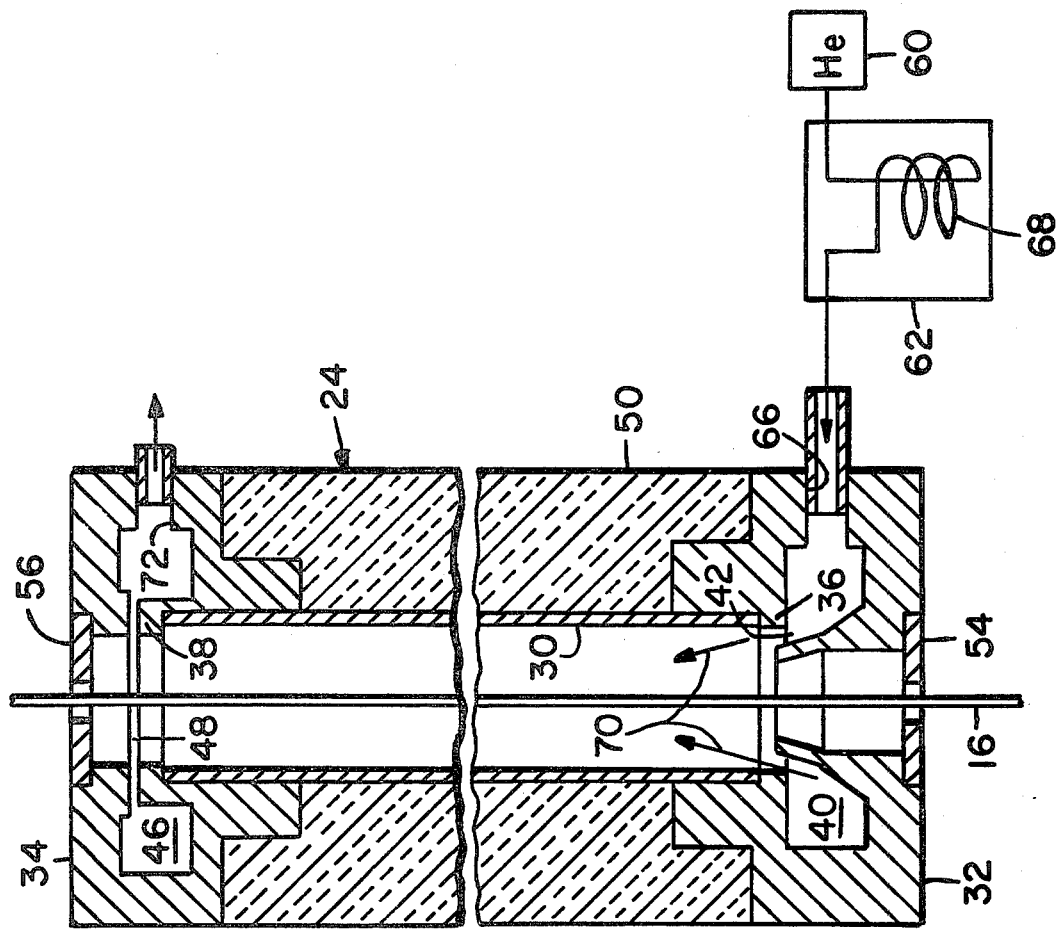
FIG. 2 is a cross-sectional view of a fiber cooling apparatus of the present invention.

A preferred embodiment of the improved fiber cooling means of the present invention is illustrated in FIG. 2. Fiber 16 is drawn through a cylindrical coolant tube 30 which may be formed of stainless steel, glass, copper, aluminum or the like. Tube 30 is provided with a lower end cap 32 for supplying dry, cooled helium thereto and with an upper end cap 34 for exhausting helium. End caps 32 and 34 are provided with inwardly projecting flanges 36 and 38, respectively, against which the ends of tube 30 abut. End cap 32 includes an annular manifold 40 which is connected to an annular slot 42. End cap 34 is provided with an annular manifold 46 which is connected to an annular slot 48. The central region of tube 30 between end caps 32 and 34 may be surrounded by layer 50 of insulating material. The end caps may be provided with seats which receive iris diaphragms 54 and 56, respectively.

A source 60 of helium is connected by way of heat exchanger 62 to the inlet orifice 66 of manifold 40. Heat exchanger 62 comprises an insulated reservoir containing a liquified gas such as liquid nitrogen, liquid argon, liquid helium or the like. Liquid nitrogen is preferred since it is relatively inexpensive. The helium from source 60 flows through a coil 68 which is submerged in the liquified gas. As the cooled helium emanates from annular slot 42, it flows toward fiber 16, and its buoyancy causes it to flow upwardly through tube 30. It is exhausted by way of slot 48, manifold 46 and exhaust orifice 72.

The iris diaphragms, which are commercially available, can be initially adjusted to provide a relatively large opening until the drawing process achieves steady state conditions. They can then be adjusted to provide relatively narrow openings to restrict the flow of helium from tube 30 in order to reduce the consumption of that gas. The iris diaphragms may be omitted, especially if the diameter of tube 30 is sufficiently small that a minimal amount of helium is required to fill that tube. Also, the top end cap is not a necessary part of the present invention, although it is a useful element if the helium is to be recovered. The helium flowing through tube 30 may be exhausted directly from the open end thereof.

The following specific example illustrates the advantages of the apparatus of the present invention. The apparatus of FIG. 2 was employed except that the iris diaphragms and the top end cap 34 were not employed. The length of tube 30 was 127 cm, and the inside diameter thereof was 1.27 cm. The opening in the bottom of end cap 32 through which fiber 16 extends was 0.87 cm. The outside diameter of insulating tube 50 was 7.62 cm.

Heat exchanger 62 was constructed by forming into a 10.16 cm diameter coil a section of 0.48 cm OD copper tubing having length of 2.67 m. The coil was submerged in a dewar of liquid nitrogen. This apparatus was capable of cooling helium gas flowing therethrough to liquid nitrogen temperature.

The top of cooler 30 was located 81 cm below the bottom of the fiber draw furnace. The coater was situated 30 cm below the bottom of cooling means 24. A pure fused silica fiber having a diameter of 125 $\mu$m was drawn from the furnace at a temperature about 2250° C. Coater 20 applied to the fiber a coating of DeSoto 950×037 UV curable acrylate manufactured by DeSoto Inc., 1700 S. Mt. Prospect Road, Des Plaines, Ill. The fiber draw rate was varied from 1 to 5 m/sec. The fiber temperature at the top of the cooler and the minimum helium flow rate required to provide a constant coating thickness are set forth in Table 1.

TABLE 1

| Draw Speed (m/sec) | Fiber Temp. at Top of Tube 30 (°C.) | He Flow Required for Constant Coating Thickness (l/min) |
|---|---|---|
| 1 | 160 | 2.7 |
| 2 | 355 | 5.3 |
| 3 | 465 | 10.5 |
| 4 | 540 | 20.4 |
| 5 | 585 | 39.9 |

It is noted that in order to achieve a constant coating thickness, the fiber temperature at the input of the coater must not exceed some predetermined value depending upon the particular coating material employed. For the DeSoto 950×037 UV curable coating, the maximum fiber temperature is about 40° C. While this type of coating material was being applied, a drawing apparatus employing a fiber cooler of the type shown in FIG. 2 was capable of drawing fiber at the rate of 6.2 m/sec. without any decrease in coating thickness. The drawing rate was limited by the inherent limit of the drawing apparatus and not by the inability of the fiber cooler to cool the fiber while maintaining fiber stability.

Figure 3:
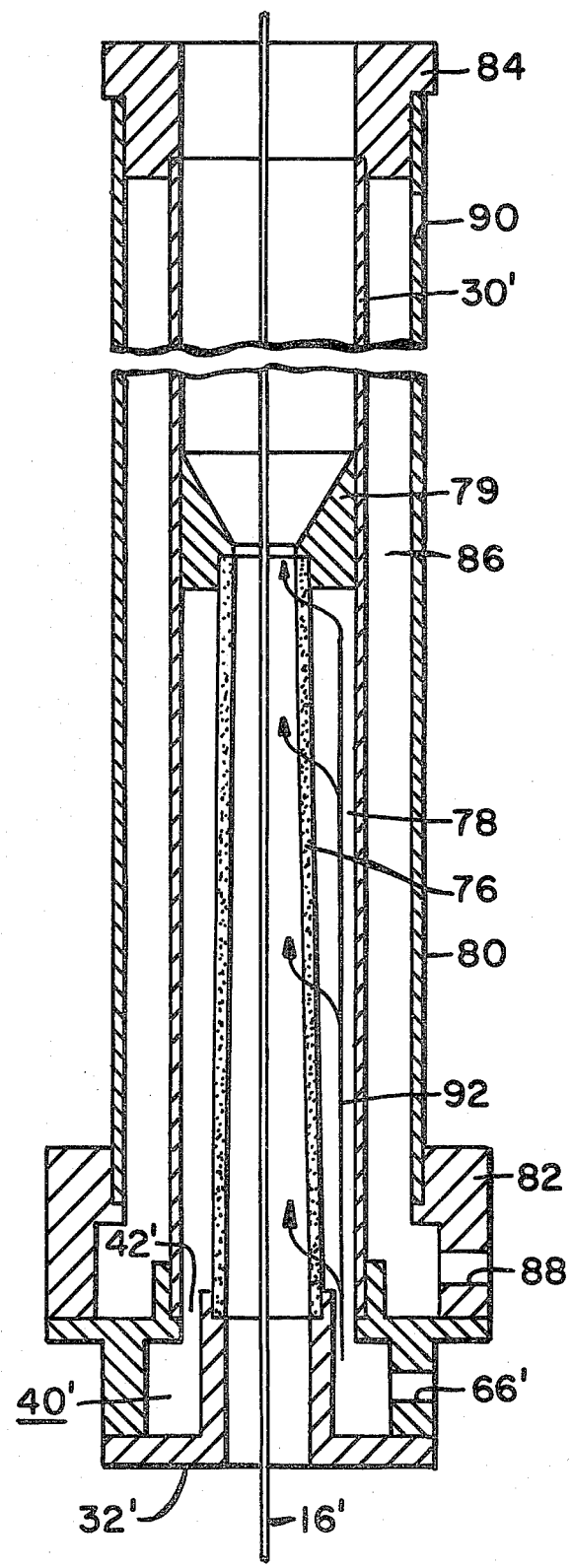
FIG. 3 is a cross-sectional view illustrating an alternative embodiment of the fiber cooling apparatus of the present invention.

In the embodiment shown in FIG. 3, in which elements similar to those of FIG. 2 are represented by primed reference numerals, the helium is diffused radially inwardly toward fiber 16' through a cylindrically-shaped, porous member 76 which may comprise a screen, porous metal tube, perforated metal tube or the like. The bottom end of tube 76 is supported by end cap 32' and the top end thereof is supported by a bracket 79 which is supported by tube 30'. Tubular housing 80, which is supported by brackets 82 and 84, forms a chamber 86 in which a liquified gas such as liquid nitrogen is disposed. This prevents heat from being transferred inwardly to the helium flowing in tube 30' from the ambient air. Chamber 86 is provided with an inlet orifice 88 and an exhaust orifice 90.

Cooled helium flows through inlet orifice 66', annular manifold 40' and annular slot 42' into a cylindrical chamber 78, which is formed between porous member 76 and tube 30'. As illustrated by multi-headed arrow 92, the helium diffuses through porous member 76 toward fiber 16'. Thus, the tendency of the inflowing helium to vibrate fiber 16' is minimized.

Whereas porous member 76 is illustrated as being slightly tapered, the walls thereof may be parallel. A 320 mesh untapered cylindrical screen has been satisfactorily demonstrated.

We claim:

1. An apparatus for drawing a single optical fiber comprising, in order of relative location:
    a solid glass preform having at one end thereof a softened root portion wherein the preform cross-sectional area tapers to the cross-sectional area of said single fiber,
    means situated along said fiber below said root portion for measuring the diameter of said fiber,
    means for cooling said fiber,
    means for applying protective coating material to said fiber, and
    means for drawing said fiber, characterized in that said means for cooling said fiber comprises
    an elongated, vertically oriented tube through which said fiber is drawn, the top of said tube being below said diameter measuring means,
    a cylindrically-shaped porous member surrounding said fiber at the bottom end of said tube,
    a chamber surrounding said porous member,
    means supplying coolant gas to said chamber, whereby said coolant gas flows inwardly through said porous member and upwardly along said fiber, and
    means situated at the top of said tube for exhausting said coolant gas.

2. An apparatus in accordance with claim 1 wherein said porous member is a screen.

* * * * *